United States Patent
Kamikariya

(10) Patent No.: US 9,931,797 B2
(45) Date of Patent: Apr. 3, 2018

(54) METHOD FOR MANUFACTURING OPTICAL FILM

(71) Applicant: Kaneka Corporation, Osaka (JP)

(72) Inventor: Naoya Kamikariya, Osaka (JP)

(73) Assignee: Kaneka Corporation, Osaka (JP)

( * ) Notice: Subject to any disclaimer, the term of this patent is extended or adjusted under 35 U.S.C. 154(b) by 28 days.

(21) Appl. No.: 15/108,158

(22) PCT Filed: Dec. 22, 2014

(86) PCT No.: PCT/JP2014/006405
§ 371 (c)(1),
(2) Date: Jun. 24, 2016

(87) PCT Pub. No.: WO2015/098095
PCT Pub. Date: Jul. 2, 2015

(65) Prior Publication Data
US 2016/0325513 A1 Nov. 10, 2016

(30) Foreign Application Priority Data
Dec. 24, 2013 (JP) .................................. 2013-265509

(51) Int. Cl.
*B29D 11/00* (2006.01)
*B29C 47/00* (2006.01)
(Continued)

(52) U.S. Cl.
CPC .... *B29D 11/00788* (2013.01); *B29C 47/0004* (2013.01); *B29C 47/0021* (2013.01);
(Continued)

(58) Field of Classification Search
CPC . B29C 47/92; B29C 47/0004; B29C 47/0021; B29C 47/8845; B29C 47/8895; B29D 11/00788; C08J 5/18
See application file for complete search history.

(56) References Cited

U.S. PATENT DOCUMENTS

2016/0053062 A1* 2/2016 Maeda .................... C08L 33/12
428/220

FOREIGN PATENT DOCUMENTS

JP 2006-232879 A 9/2006
JP 2008-055890 A 3/2008
(Continued)

OTHER PUBLICATIONS

JP 2008074918 A machine translation.*
(Continued)

*Primary Examiner* — Mathieu Vargot
(74) *Attorney, Agent, or Firm* — Osha Liang LLP

(57) ABSTRACT

A method for manufacturing an optical film includes molding a sheet-shaped rubber-containing thermoplastic resin composition discharged in a molten state from a die outlet of an extruder by inserting the composition between a pair of smoothing rollers including an elastic roller, wherein a melt viscosity $\eta$ of the rubber-containing thermoplastic resin composition as measured at a temperature of the rubber-containing thermoplastic resin composition during the discharge from a die and a shear velocity of 122 $sec^{-1}$ is 600 Pa·sec or more but 2000 Pa·sec or less; a surface temperature of the elastic roller is $Tg-70°$ C. or higher but $Tg-20°$ C. or lower; and $\eta \times V/P$ is 5000 or less, wherein V represents a line velocity (m/min) and P represents a pressure applied by the elastic roller (kgf/cm).

6 Claims, 2 Drawing Sheets

(51) Int. Cl.

| | | |
|---|---|---|
| *B29C 47/92* | (2006.01) | |
| *C08J 5/18* | (2006.01) | |
| *B29C 47/88* | (2006.01) | |
| B29K 21/00 | (2006.01) | |
| B29L 31/34 | (2006.01) | |
| B29K 101/12 | (2006.01) | |
| B29K 105/16 | (2006.01) | |
| B29L 7/00 | (2006.01) | |
| B29L 11/00 | (2006.01) | |
| G02B 1/04 | (2006.01) | |

(52) U.S. Cl.
CPC ...... *B29C 47/8845* (2013.01); *B29C 47/8895* (2013.01); *B29C 47/92* (2013.01); *C08J 5/18* (2013.01); *B29C 2947/922* (2013.01); *B29C 2947/9258* (2013.01); *B29C 2947/92514* (2013.01); *B29C 2947/92704* (2013.01); *B29C 2947/92923* (2013.01); *B29K 2021/00* (2013.01); *B29K 2021/003* (2013.01); *B29K 2101/12* (2013.01); *B29K 2105/16* (2013.01); *B29K 2995/0022* (2013.01); *B29K 2995/0026* (2013.01); *B29L 2007/008* (2013.01); *B29L 2011/00* (2013.01); *B29L 2031/3475* (2013.01); *C08J 2333/24* (2013.01); *C08J 2379/08* (2013.01); *C08J 2409/02* (2013.01); *C08J 2451/00* (2013.01); *G02B 1/04* (2013.01)

(56) References Cited

FOREIGN PATENT DOCUMENTS

| | | | |
|---|---|---|---|
| JP | 2008-074918 A | | 4/2008 |
| JP | 2008074918 A | * | 4/2008 |
| JP | 2008-239741 A | | 10/2008 |
| JP | 2008-273140 A | | 11/2008 |
| JP | 2010-100746 A | | 5/2010 |
| JP | 2010-231016 A | | 10/2010 |
| JP | 2011-126084 A | | 6/2011 |

OTHER PUBLICATIONS

International Search Report and Written Opinion dated Mar. 24, 2015, in corresponding International Application No. PCT/JP2014/006405, with English translation (14 pages).

PCT International Preliminary Report on Patentability dated Jun. 28, 2016, in corresponding International Application No. PCT/JP2014/006405, with English translation (11 pages).

* cited by examiner

[Fig. 1]
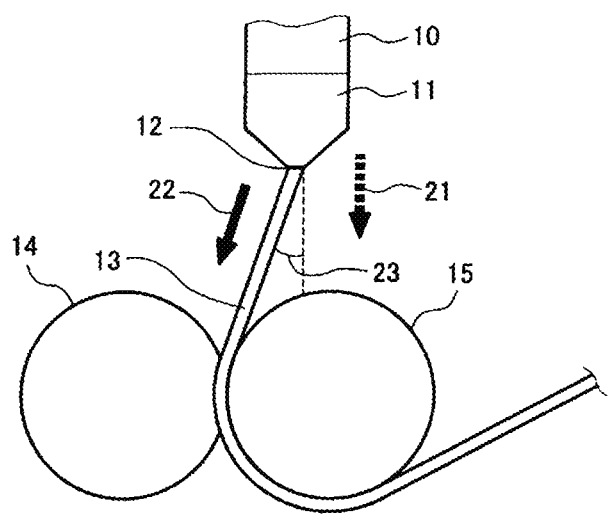

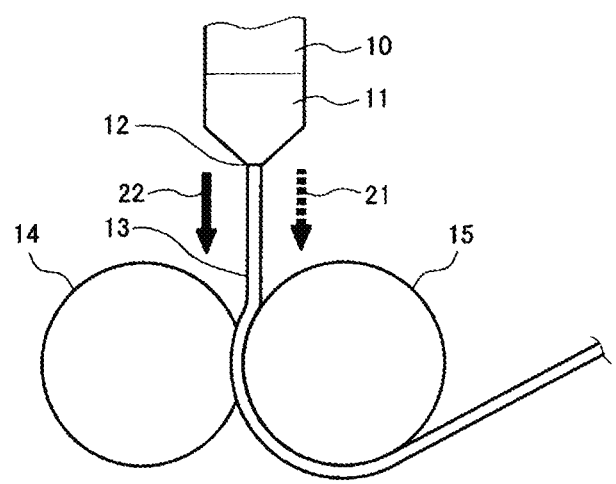
[Fig. 2]

METHOD FOR MANUFACTURING OPTICAL FILM

TECHNICAL FIELD

The present invention relates to a method for manufacturing an optical film.

BACKGROUND

An optical film typified by a polarizer protective film for protecting a polarizer or a film substrate for liquid crystal display is required to have optical transparency and optical homogeneity.

As a method for manufacturing such an optical film, a melt extrusion method is known in which a resin composition as a film raw material is melted in a melt extruder and extruded from a die in film form to form a film. Further, a film molding method is known in which a film-shaped molten resin extruded from a die by such a melt extrusion method is inserted between a pair of smoothing rollers in order to reduce the thickness variation or surface irregularities of the film and to improve the surface smoothness of the film (see PTL 1 and PTL 2).

CITATION LIST

Patent Literatures

PTL 1: JP 2010-231016 A
PTL 2: JP 2008-55890 A

SUMMARY OF INVENTION

In such an insertion molding method, an elastic roller having a surface metal film may be used as one of the smoothing rollers to evenly smoothen the film at a low linear pressure.

However, the present inventor has intensively studied and found that when a resin composition as a film raw material contains fine rubber particles, minute recesses not appropriate for optical applications are formed in a film surface during insertion molding. Further, the present inventor has intensively studied and found that when a film-shaped molten resin obtained by melting and extruding a thermoplastic resin composition containing rubber particles is subjected to insertion molding, the film-shaped molten resin is likely to be pressed with air being entrained so that minute recesses are formed in a film surface due to air entrainment.

One or more embodiments of the present invention provide a method for manufacturing an optical film, capable of inhibiting the formation of minute recesses due to air entrainment during insertion molding after melt extrusion.

The present inventor has found that air entrainment is greatly influenced by the melt viscosity of a resin composition, the temperature of an elastic roller during insertion molding, a line velocity, and an insertion pressure applied by rollers. Based on this finding, the present inventor has found that air entrainment during insertion molding can be inhibited by setting the melt viscosity of a resin composition, the temperature of an elastic roller during insertion molding, a line velocity, and an insertion pressure applied by rollers to satisfy their respective specific requirements so that a film having few minute recesses in its surface can be manufactured.

More specifically, one or more embodiments of the present invention are directed to a method for manufacturing an optical film, the method comprising a step of molding a sheet-shaped rubber-containing thermoplastic resin composition discharged in a molten state from a die outlet of an extruder by inserting the composition between a pair of smoothing rollers comprising an elastic roller and a cast roller, wherein the step satisfies requirements below:

a melt viscosity $\eta$ of the rubber-containing thermoplastic resin composition as measured at a temperature of the rubber-containing thermoplastic resin composition during the discharge from a die and a shear velocity of 122 $\sec^{-1}$ is 600 Pa·sec or more but 2000 Pa·sec or less;

a surface temperature of the elastic roller is Tg−70° C. or higher but Tg−20° C. or lower, wherein Tg represents a glass transition temperature (° C.) of the rubber-containing thermoplastic resin composition; and $\eta \times V/P$ is 5000 or less, wherein V represents a line velocity (m/min) and P represents a pressure applied by the elastic roller (kgf/cm).

It is preferred that a direction of flow of the sheet-shaped rubber-containing thermoplastic resin composition is inclined toward a side of the cast roller with respect to a direction of discharge from the die outlet so that an angle which the direction of flow of the sheet-shaped rubber-containing thermoplastic resin composition forms with the direction of discharge from the die outlet is in a range of 0.1 degrees or more but 20 degrees or less.

It is preferred that the optical film has a thickness of 30 μm or more but less than 80 μm.

It is preferred that the melt viscosity of the rubber-containing thermoplastic resin composition as measured at 250° C. and a shear velocity of 122 $\sec^{-1}$ is 700 Pa·sec or more but 1250 Pa·sec or less.

It is preferred that the rubber-containing thermoplastic resin composition contains an acrylic resin and acrylic rubber particles.

It is preferred that the rubber-containing thermoplastic resin composition contains at least one selected from the group consisting of an acrylic resin copolymerized with an N-substituted maleimide compound as a copolymerization component, a glutaric anhydride acrylic resin, an acrylic resin having a lactone ring structure, a glutarimide acrylic resin, a hydroxyl group- and/or carboxyl group-containing acrylic resin, an aromatic vinyl-containing acrylic polymer obtained by polymerization of an aromatic vinyl monomer and another monomer copolymerizable therewith or a hydrogenated aromatic vinyl-containing acrylic polymer obtained by partial or complete hydrogenation of aromatic rings thereof, and an acrylic polymer containing a cyclic acid anhydride repeating unit.

One or more embodiments of the present invention are also directed to an optical film satisfying the following requirements.

One or more embodiments of the present invention are directed to an optical film comprising a rubber-containing thermoplastic resin composition, wherein a number of recess defects having a major axis length of 20 μm or more present in a film surface per A4 size (210 mm×297 mm) is 20 or less.

It is preferred that the optical film has a film thickness of 30 μm or more but less than 80 μm.

It is preferred that in the optical film, the rubber-containing thermoplastic resin composition contains an acrylic resin and acrylic rubber particles.

It is preferred that in the optical film, the rubber-containing thermoplastic resin composition contains at least one selected from the group consisting of an acrylic resin copolymerized with an N-substituted maleimide compound as a copolymerization component, a glutaric anhydride acrylic resin, an acrylic resin having a lactone ring structure, a glutarimide acrylic resin, a hydroxyl group- and/or carboxyl group-containing acrylic resin, an aromatic vinyl-containing acrylic polymer obtained by polymerization of an aromatic vinyl monomer and another monomer copolymerizable therewith or a hydrogenated aromatic vinyl-containing acrylic polymer obtained by partial or complete hydrogenation of aromatic rings thereof, and an acrylic polymer containing a cyclic acid anhydride repeating unit.

It is preferred that in the optical film, the acrylic rubber particles are made of an acrylic graft copolymer containing an acrylic ester-based rubbery polymer.

It is preferred that the optical film has an orientation birefringence of $-1.7 \times 10^{-4}$ to $1.7 \times 10^{-4}$.

It is preferred that the optical film has a photoelastic constant of $-10 \times 10^{-12}$ to $4 \times 10^{-12}$ $Pa^{-1}$.

It is preferred that in the optical film, the acrylic rubber particles have a graft copolymer part containing a structural unit derived from a (meth)acrylic monomer having an alicyclic structure, a heterocyclic structure, or an aromatic group.

It is preferred that in the optical film, the acrylic rubber particles have a graft copolymer part containing a structural unit derived from at least one monomer selected from the group consisting of benzyl (meth)acrylate, dicyclopentanyl (meth)acrylate, and phenoxyethyl (meth)acrylate.

According to one or more embodiments of the present invention, it is possible to provide a method for manufacturing an optical film, capable of inhibiting the formation of recesses in a film surface during insertion molding after melt extrusion. The manufacturing method according to one or more embodiments of the present invention makes it possible to produce, from a thermoplastic resin composition containing rubber particles, an optical film that has few recesses in its surface and is therefore suitably used also for optical applications.

BRIEF DESCRIPTION OF DRAWINGS

FIG. 1 is a schematic side view showing insertion molding of a sheet-shaped thermoplastic resin composition according to one embodiment of the present invention.

FIG. 2 is a schematic side view showing insertion molding of a sheet-shaped thermoplastic resin composition according to another embodiment of the present invention.

DESCRIPTION OF EMBODIMENTS

Hereinafter, a manufacturing method according to one or more embodiments of the present invention will be described in detail.

FIG. 1 is a schematic view showing insertion molding according to one or more embodiments of the method for manufacturing an optical film of the present invention. A thermoplastic resin composition as a film raw material is charged into an extruder 10 and heated in the extruder 10 to a temperature equal to or higher than the glass transition temperature thereof so as to be turned into a molten state. The thermoplastic resin composition in a molten state is transferred to a T-die 11 attached to the outlet side of the extruder 10, and is then discharged from a die outlet 12 provided at the tip of the die while being maintained in a molten state. The discharged thermoplastic resin composition is a thermoplastic resin composition 13 that is in a molten state and has a sheet shape based on the shape of the die outlet.

The sheet-shaped thermoplastic resin composition 13 in a molten state is inserted between a pair of smoothing rollers to smoothen a sheet surface. One of the smoothing rollers is an elastic roller 14 and the other is a cast roller 15. The elastic roller 14 refers to a roller obtained by covering the surface of a roller made of an elastic material, such as rubber, with a metal film. The surface metal film makes the roller surface smooth, and therefore the elastic roller functions as a smoothing roller. The cast roller 15 is a hard roller made of a metal. The sheet-shaped thermoplastic resin composition discharged from the die outlet 12 is inserted between the elastic roller 14 and the cast roller 15 to cool the thermoplastic resin composition to a temperature equal to or lower than the glass transition temperature thereof and to improve the smoothness of a sheet surface. It is to be noted that the insertion molding is a step for smoothing a film surface, and is therefore different from a step for stretching a film.

It is to be noted that FIG. 1 is a side view of the sheet-shaped thermoplastic resin composition.

In FIG. 1, an arrow 21 represents the direction of discharge from the die outlet (direction of flow of the molten resin at the die outlet), and an arrow 22 represents the direction of flow of the sheet-shaped thermoplastic resin composition after discharge from the die. As shown in FIG. 2, when the point at which the sheet-shaped thermoplastic resin composition is inserted between the pair of smoothing rollers (point at which the smoothing rollers and the sheet-shaped resin composition come in contact with each other) is located on an extended line from the die outlet (extended line parallel to the direction of discharge from the die outlet), the direction of discharge from the die outlet represented by the arrow 21 and the direction of flow of the sheet-shaped thermoplastic resin composition represented by the arrow 22 are the same. However, in FIG. 1, the point at which the sheet-shaped thermoplastic resin composition is inserted between the pair of smoothing rollers is not located on an extended line from the die outlet (extended line parallel to the direction of discharge from the die outlet), and the die outlet is shifted to the side of the cast roller 15 so that the direction 22 of flow of the sheet-shaped rubber-containing thermoplastic resin composition is inclined toward the side of the cast roller 15 with respect to the direction 21 of discharge from the die outlet. In this regard, the angle which the direction of flow of the sheet-shaped rubber-containing thermoplastic resin composition forms with the direction of discharge from the die outlet is denoted by reference sign 23.

One or more embodiments of the present invention provide a method for continuously manufacturing an optical film extending in its longitudinal direction by continuously performing discharge from an extruder and insertion molding.

One or more embodiments of the present invention are intended to prevent the occurrence of air entrainment during insertion molding using a pair of smoothing rollers, and is therefore required to satisfy the following three requirements.

(1) Melt Viscosity of Resin Composition

The melt viscosity η of a rubber-containing thermoplastic resin composition used in the manufacturing method according to one or more embodiments of the present invention as measured at the temperature of the rubber-containing thermoplastic resin composition during discharge from a die and a shear velocity of 122 $sec^{-1}$ is 600 Pa·sec or more but 2000 Pa·sec or less. The temperature of the rubber-containing thermoplastic resin composition during discharge from a die shall be set so that this requirement is satisfied. This temperature is a resin composition temperature measured just after discharge from a die but before insertion between a pair of smoothing rollers. This resin composition temperature can be adjusted by changing the preset temperature of an extrusion machine such as the cylinder temperature of an extruder or the temperature of an adapter or die or by controlling a condition such as the screw rotation speed of an extruder or the type of screw (e.g., compression ratio) of an extruder. If the melt viscosity is less than 600 Pa·sec, the resin composition temperature needs to be increased to exceed a resin decomposition start temperature so that a resin is thermally deteriorated and a film has many defects. If the melt viscosity exceeds 2000 Pa·sec, the viscosity of the resin composition is excessively high so that air entrainment is likely to occur during insertion molding, which is undesirable because a plurality of minute recesses are formed in a film surface. Preferably, the melt viscosity is 700 Pa·sec or more but 1700 Pa·sec or less.

Further, the molecular weight of a matrix or the composition/molecular weight of rubber particles of the rubber-containing thermoplastic resin composition is preferably designed so that the melt viscosity of the rubber-containing thermoplastic resin composition as measured at 250° C. and a shear velocity of 122 sec$^{-1}$ is preferably 700 Pa·sec or more but 1250 Pa·sec or less. This case is preferred because molding is easily performed at a molding temperature lower than a resin decomposition start temperature while the occurrence of air entrainment is prevented.

(2) Temperature of Elastic Roller

When the glass transition temperature of the rubber-containing thermoplastic resin composition is defined as Tg (° C.), the surface temperature of an elastic roller is Tg–70° C. or higher but Tg–20° C. or lower. When insertion molding is performed using smoothing rollers while the roller temperature is maintained in this range, the effect of inhibiting air entrainment during insertion molding can be achieved. If the roller temperature is lower than Tg–70° C., a molten film is solidified just after contact with the roller so that air entrainment is likely to occur. If the roller temperature exceeds Tg–20° C., the inner pressure of the elastic roller is high so that the sealing of a temperature control medium in the elastic roller is poor and therefore the temperature control medium leaks, which makes it difficult to achieve stable production. It is to be noted that as described above, the temperature of the elastic roller is lower than the temperature of the resin composition during discharge from a die, and therefore the sheet-shaped thermoplastic resin composition is quickly cooled by insertion molding, and the application of pressure by the smoothing rollers during the cooling makes it possible to achieve the effect of smoothing a film surface.

On the other hand, the surface temperature of a cast roller is not particularly limited, but is preferably Tg–50° C. or higher but Tg or lower. If the surface temperature of the cast roller is less than Tg–50° C., a film is less likely to come in close contact with the cast roller, which is undesirable because wrinkles are formed in a film surface. Further, if the surface temperature of the cast roller is higher than Tg, a film sticks to the cast roller so that undesirable release marks are left in the width direction of the film after the film is released from the cast roller to be transferred to the next cooling roller. The difference in temperature between the elastic roller and the cast roller is preferably 50° C. or lower. If the temperature difference is higher than 50° C., the difference in temperature between both surfaces of a film becomes large just after insertion molding, which is undesirable because wrinkles or the like are formed when the film is released from the cast roller.

(3) Line Velocity and Applied Pressure

When a line velocity is defined as V m/min and a pressure applied by the elastic roller is defined as P kgf/cm, η×V/P is 5000 or less. Here, the line velocity refers to a flow rate of the sheet-shaped thermoplastic resin composition. Further, η is the melt viscosity described above with reference to the requirement (1).

Air entrainment is less likely to occur in reverse proportion to resin viscoelasticity and the rate of entry between insertion rollers and in proportion to a pressure applied by an elastic roller. The resin viscoelasticity may be considered as the melt viscosity η just before entry between insertion rollers, and the rate of entry between insertion rollers is synonymous with the line velocity V. The three factors concerning air entrainment during insertion molding need to be set not independently but in combination. This is particularly preferred because the line velocity is increased when molding is performed so as to achieve a small film thickness. Under conditions where the line velocity is high (thickness is small) and therefore air entrainment is likely to occur, air entrainment that does not occur when the line velocity is low (thickness is large) occurs unless both the applied pressure and the resin viscoelasticity are appropriately set. This is because when only the resin viscoelasticity is set, there is an upper limit to a resin temperature to be set in consideration of thermal degradation, and the applied pressure is also limited by the withstanding pressure of the roller. For this reason, air entrainment cannot be resolved by independently setting these factors, and therefore the resin viscoelasticity and the applied pressure need to be simultaneously set according to the line velocity. That is, if η×V/P exceeds 5000, the effect of inhibiting the formation of recesses due to air entrainment cannot be achieved even when the above-described requirements (1) and (2) are satisfied. Preferably, η×V/P is 4500 or less. The lower limit of η×V/P is not particularly limited, but when the value of η×V/P is set to be much lower than the upper limit, productivity needs to be reduced. Therefore, η×V/P is preferably set to 1000 or more.

In one or more embodiments of the present invention, as shown in FIG. 2, the angle which the direction of flow of the sheet-shaped rubber-containing thermoplastic resin composition forms with the direction of discharge from the die outlet may be 0°. However, as shown in FIG. 1, the direction of flow of the sheet-shaped rubber-containing thermoplastic resin composition is preferably inclined toward the side of the cast roller with respect to the direction of discharge from the die outlet, and the angle 23 which the direction of flow of the sheet-shaped rubber-containing thermoplastic resin composition forms with the direction of discharge from the die outlet is preferably in the range of 0.1° or more but 20° or less.

The present inventor has found that air entrainment during insertion molding specifically occurs on the side of a film surface that comes in contact with the cast roller. The reason for this is considered to be that the cast roller is hard and therefore entrained air is less likely to be eliminated. As described above, when the direction of flow of the sheet-shaped rubber-containing thermoplastic resin composition is inclined toward the side of the cast roller with respect to the direction of discharge from the die outlet, the sheet-shaped rubber-containing thermoplastic resin composition slightly faster comes in contact with the cast roller than with the elastic roller, which makes it possible to easily eliminate air entrained on the side of the cast roller and to more effectively prevent the formation of recesses due to air entrainment. If the angle is less than 0.1°, the effect obtained by the inclination is not sufficient. On the other hand, if the angle exceeds 20°, the inclination of the molten resin is steep so that the molten resin vibrates between the die and the rollers, which is undesirable because there is a possibility that quality such as thickness or streaks is adversely affected.

After insertion molding is performed under the above conditions, a step of knurling film ends or laminating a protective film on film ends to achieve an excellent appearance of a film roller, a step of slitting a film along its both ends to cut the film to have a desired product width, a step of examining foreign matter in a film, or a step of stretching a film may further be performed, if necessary. In this way, an optical film is manufactured.

The thickness of the optical film manufactured by one or more embodiments of the present invention is not particularly limited. Conventionally, when the thickness of the optical film is smaller, there is a higher possibility that recesses formed by air entrainment will cause a problem in terms of optical characteristics. However, one or more embodiments of the present invention are highly effective at inhibiting air entrainment even when a film has a thickness as very small as 30 μm or more but less than 80 μm. Therefore, the application of one or more embodiments of the present invention to such a thin film is of large significance.

The thermoplastic resin composition that can be used in one or more embodiments of the present invention is not particularly limited as long as the thermoplastic resin composition can be used as an optical film and can be molded by melt extrusion. Examples of the thermoplastic resin composition include thermoplastic resin compositions such as polycarbonate resins, aromatic vinyl-based resins and hydrogenated products thereof, polyolefin-based resins, acrylic resins, polyester-based resins, polyarylate resins, polyimide-based resins, polyethersulfone resins, polyamide-based resins, cellulose-based resins, and polyphenylene oxide resins.

A thermoplastic resin composition containing rubber particles can be used as a material of an optical film, but there is a case where the rubber particles are present in the surface of the film so that the surface smoothness of the film is impaired. In this case, it is expected that the surface smoothness of the film will be improved by pushing the rubber particles into the film by insertion molding performed after melt extrusion. However, when the compatibility between the rubber particles and a matrix resin is low, the rubber particles are likely to aggregate in the film, and as a result surface irregularities of the film become large. In this case, surface minute irregularities cannot be reduced by insertion molding performed under normal conditions, and as a result, there is a disadvantage that the optical film has undesired surface unevenness.

However, according to one or more embodiments of the present invention, even when the thermoplastic resin composition contains rubber particles and the compatibility between the rubber particles and a matrix resin is low, minute surface irregularities can be reduced to achieve the effect of reducing surface unevenness.

Hereinbelow, an acrylic resin composition containing a rubbery polymer will be specifically described as one example of the rubber particle-containing thermoplastic resin composition that can be appropriately used in one or more embodiments of the present invention.

The rubbery polymer may be a polymer having a glass transition temperature of lower than 20° C., and examples thereof include a butadiene-based cross-linked polymer, a (meth)acrylic cross-linked polymer, and an organosiloxane-based cross-linked polymer. Among them, a (meth)acrylic cross-linked polymer (in this specification, also referred to as acrylic rubbery polymer or acrylic rubber particles) is particularly preferred from the viewpoint of the weatherability (light resistance) and transparency of the film.

Examples of the acrylic rubbery polymer include ABS resin rubber and ASA resin rubber. However, from the viewpoint of transparency, the following acrylic graft copolymer containing an acrylic ester-based rubbery polymer (hereinafter, simply referred to as "acrylic graft copolymer") can be preferably used.

The acrylic graft copolymer can be obtained by polymerization of a monomer mixture mainly containing a methacrylic ester in the presence of an acrylic ester-based rubbery polymer.

The acrylic ester-based rubbery polymer is a rubbery polymer mainly containing an acrylic ester. More specifically, the acrylic ester-based rubbery polymer is preferably a polymer obtained by polymerization of a monomer mixture (100 wt %) composed of 50 to 100 wt % of an acrylic ester and 50 to 0 wt % of another copolymerizable vinyl-based monomer and 0.05 to 10 parts by weight (per 100 parts by weight of the monomer mixture) of a polyfunctional monomer having two or more unconjugated reactive double bonds per molecule. The polymerization may be performed using a mixture of all the monomers or may be performed in two or more stages by changing the composition of the monomers.

The acrylic ester to be used is preferably one having an alkyl group having 1 to 12 carbon atoms in terms of polymerizability and cost. Examples of the acrylic ester include methyl acrylate, ethyl acrylate, propyl acrylate, n-butyl acrylate, 2-butyl acrylate, isobutyl acrylate, benzyl acrylate, cyclohexyl acrylate, 2-ethylhexyl acrylate, n-octyl acrylate, phenyl acrylate, and phenoxyethyl acrylate. These monomers may be used in combination of two or more of them. The amount of the acrylic ester is preferably 50 wt % or more but 100 wt % or less, more preferably 60 wt % or more but 99 wt % or less, even more preferably 70 wt % or more but 99 wt % or less, most preferably 80 wt % or more but 99 wt % or less per 100 wt % of the monomer mixture. If the amount of the acrylic ester is less than 50 wt %, impact resistance is reduced and tensile elongation at break is reduced so that cracking is likely to occur when the film is cut.

The another copolymerizable vinyl-based monomer is particularly preferably a methacrylic ester in terms of weatherability and transparency. Examples of the methacrylic ester include methyl methacrylate, ethyl methacrylate, propyl methacrylate, n-butyl methacrylate, 2-butyl methacrylate, isobutyl methacrylate, benzyl methacrylate, cyclohexyl methacrylate, phenoxyethyl methacrylate, 2-ethylhexyl methacrylate, phenyl methacrylate, and n-octyl methacrylate. Further, aromatic vinyls, and derivatives thereof and vinyl cyanides are also preferred, and examples thereof include styrene, methyl styrene, acrylonitrile, and methacrylonitrile. Other examples of the another copolymerizable vinyl-based monomer include unsubstituted and/or substituted maleic anhydrides, (meth)acrylamides, vinyl esters, vinylidene halides, (meth)acrylic acid and salts thereof, and (hydroxyalkyl) acrylic esters.

The polyfunctional monomer may be a commonly-used one, and examples thereof include allyl methacrylate, allyl acrylate, triallyl cyanurate, triallyl isocyanurate, diallyl phthalate, diallyl maleate, divinyl adipate, divinyl benzene, ethylene glycol dimethacrylate, diethylene glycol methacrylate, triethylene glycol dimethacrylate, trimethylol propane trimethacrylate, tetramethylol methane tetramethacrylate, dipropylene glycol dimethacrylate, and acrylates thereof. These polyfunctional monomers may be used in combination of two or more of them.

The amount of the polyfunctional monomer is preferably 0.05 to 10 parts by weight, more preferably 0.1 to 5 parts by weight per 100 parts by weight of the total amount of the monomer mixture. If the amount of the polyfunctional monomer to be added is less than 0.05 parts by weight, formation of a cross-linked polymer tends to be impossible. If the amount of the polyfunctional monomer exceeds 10 parts by weight, the film tends to have low cracking resistance.

The volume-average particle size of the rubbery polymer is preferably 20 to 450 nm, more preferably 20 to 300 nm, even more preferably 20 to 150 nm, most preferably 30 to 80 nm. If the volume-average particle size of the rubbery polymer is less than 20 nm, there is a case where cracking resistance is deteriorated. On the other hand, if the volume-average particle size of the rubbery polymer exceeds 450 nm, there is a case where transparency is reduced. It is to be noted that the volume-average particle size can be measured by a dynamic scattering method using, for example, MICROTRAC UPA150 (manufactured by NIKKISO CO., LTD.).

The acrylic graft copolymer is preferably one obtained by polymerization of 95 to 25 parts by weight of a monomer mixture mainly containing a methacrylic ester in the presence of 5 to 90 parts by weight (more preferably 5 to 75 parts by weight) of the acrylic ester-based rubbery polymer in at least one stage. The amount of the methacrylic ester in the graft copolymerization composition (monomer mixture) is preferably 50 wt % or more. If the amount of the methacrylic ester is less than 50 wt %, the resulting film tends to have low hardness and low rigidity. Also as a monomer used for graft copolymerization, the above-described methacrylic ester, acrylic ester, or vinyl-based monomer copolymerizable therewith may be used, but the methacrylic ester or the acrylic ester is suitably used. From the viewpoint of compatibility with an acrylic resin, methyl methacrylate is preferred, and from the viewpoint of inhibiting zipper-like depolymerization, methyl acrylate, ethyl acrylate, or n-butyl acrylate is preferred.

From the viewpoint of optical isotropy, a (meth)acrylic monomer having an alicyclic structure, a heterocyclic structure, or an aromatic group (referred to as "ring structure-containing (meth)acrylic monomer") is preferred. Specific examples of such a ring structure-containing (meth)acrylic monomer include benzyl (meth)acrylate, dicyclopentanyl (meth)acrylate, and phenoxyethyl (meth)acrylate. The amount of the ring structure-containing (meth)acrylic monomer to be used is preferably 1 to 100 wt %, more preferably 5 to 70 wt %, most preferably 5 to 50 wt % per 100 wt % of the total amount of the monomer mixture (total amount of the ring structure-containing (meth)acrylic monomer and another monofunctional monomer copolymerizable therewith). Here, the another monofunctional monomer copolymerizable therewith may also be the above-described methacrylic ester, acrylic ester, or another copolymerizable vinyl-based monomer, but preferably contains the methacrylic ester and the acrylic ester. The methacrylic ester content is preferably 0 to 98 wt %, more preferably 0.1 to 98 wt %, even more preferably 1 to 94 wt %, particularly preferably 30 to 90 wt % per 100 wt % of the total amount of the ring structure-containing vinyl-based monomer and another monofunctional monomer copolymerizable therewith. Further, the acrylic ester content is preferably 0 to 98 wt %, more preferably 0.1 to 98 wt %, even more preferably 1 to 50 wt %, particularly preferably 5 to 50 wt % per 100 wt % of the total amount of the ring structure-containing vinyl-based monomer and the another monofunctional monomer copolymerizable therewith.

The rate of grafting onto the acrylic ester-based rubbery polymer is preferably 10 to 250%, more preferably 40 to 230%, most preferably 60 to 220%. If the graft rate is less than 10%, there is a fear that the acrylic graft copolymer is likely to aggregate in a molded body, which reduces transparency or causes foreign matter. Further, tensile elongation at break tends to reduce so that cracking is likely to occur when the film is cut. If the graft rate exceeds 250%, melt viscosity during molding, for example, during film molding is high so that film moldability tends to deteriorate.

The graft rate is the weight ratio of graft component of the acrylic graft copolymer, and is measured in the following manner.

Two grams of the obtained acrylic graft copolymer is dissolved in 50 mL of methyl ethyl ketone, and the resulting solution is separated into an insoluble fraction and a soluble fraction by centrifugation using a centrifugal separator (CP 60E manufactured by Hitachi Koki Co., Ltd.) at a rotation speed of 30000 rpm and a temperature of 12° C. for 1 hour (three sets of centrifugation are performed in total). The graft rate is calculated by the following formula from the weight of the obtained insoluble fraction and the weight of the acrylic ester-based rubbery polymer contained in the acrylic graft copolymer.

$$\text{Graft rate (\%)} = [\{(\text{weight of methyl ethyl ketone insoluble fraction}) - (\text{weight of acrylic ester-based rubbery polymer})\}/(\text{weight of acrylic ester-based rubbery polymer})] \times 100$$

The acrylic graft copolymer can be manufactured by a common emulsion polymerization method. A specific example of such a common emulsion polymerization method is a method in which an acrylic ester monomer is continuously polymerized using an emulsifier in the presence of a water-soluble polymerization initiator.

In the emulsion polymerization method, continuous polymerization is preferably performed in a single reaction tank. The use of two or more reaction tanks is not preferred because the mechanical stability of a latex is reduced.

A polymerization temperature is preferably 30° C. or higher but 100° C. or lower, more preferably 50° C. or higher but 80° C. or lower. If the polymerization temperature is lower than 30° C., productivity tends to reduce. If the polymerization temperature exceeds 100° C., quality tends to reduce due to, for example, an excessively high target molecular weight. Raw materials such as an acrylic ester monomer, an initiator, an emulsifier, and deionized water are continuously and accurately added to a polymerization reactor under the control of metering pumps, and if necessary, may be previously cooled to ensure the amount of heat removal to remove heat generated by polymerization in the reactor. If necessary, a polymerization inhibitor, a coagulant, a flame retardant, an antioxidant, or a pH regulator may be added to a latex discharged from the reactor, the unreacted monomer may be recovered, or post-polymerization may be performed. Then, a copolymer can be obtained by performing coagulation, heat treatment, dehydration, washing with water, and drying according to a known method.

In the emulsion polymerization, a common polymerization initiator can be used. Examples of the polymerization initiator to be used include inorganic peroxides such as potassium persulfate and sodium persulfate, organic peroxides such as cumene hydroperoxide and benzoyl peroxide, and oil-soluble initiators such as azobisisobutyronitrile. These initiators may be used singly or in combination of two or more of them. Each of these initiators may be combined with a reducing agent such as sodium sulfite, sodium thiosulfate, sodium formaldehyde, sulfoxylate, ascorbic acid, or a complex of ferrous sulfate and disodium ethylenediaminetetraacetate so as to be used as a common redox-type polymerization initiator.

The polymerization initiator may be used in combination with a chain transfer agent. Examples of the chain transfer agent include alkyl mercaptans having 2 to 20 carbon atoms, mercapto acids, thiophenol, and carbon tetrachloride. These chain transfer agents may be used singly or in combination of two or more of them.

The emulsifier used in the emulsion polymerization method is not particularly limited as long as the emulsifier is a common emulsifier for emulsion polymerization. Examples of the emulsifier include anionic surfactants such as a sulfuric acid ester salt-based surfactant (e.g., sodium alkyl sulfate), a sulfonate-based surfactant (e.g., sodium alkylbenzene sulfonate, sodium alkyl sulfonate, or sodium dioctyl sulfosuccinate), and a phosphate-based surfactant (e.g., sodium alkyl phosphate or sodium polyoxyethylene alkyl ether phosphate). The above-mentioned sodium salts may be other alkali metal salts such as potassium salts or ammonium salts. These emulsifiers may be used singly or in combination of two or more of them. A nonionic surfactant typified by polyoxyalkylene or a derivative thereof obtained by substituting its terminal hydroxyl group with alkyl or aryl may be used or may be partially combined. Among them, in terms of polymerization reaction stability and particle size controllability, a sulfonate-based surfactant or a phosphate-based surfactant is preferably used, and particularly, dioctyl sulfosuccinate or polyoxyethylene alkyl ether phosphoric acid ester is more preferably used.

The amount of the emulsifier to be used is preferably 0.05 parts by weight or more but 10 parts by weight, more preferably 0.1 parts by weight or more but 1.0 part by weight or less per 100 parts by weight of the total amount of the monomer components. If the amount of the emulsifier is less than 0.05 parts by weight, the particle size of the copolymer tends to be excessively large, and if the amount of the emulsifier is more than 10 parts by weight, the particle size of the copolymer tends to be excessively small or the particle size distribution of the copolymer tends to deteriorate.

The rubbery polymer-containing acrylic resin composition used in one or more embodiments of the present invention is not particularly limited, but is preferably a mixed composition of at least one acrylic rubbery polymer and at least one acrylic resin.

The acrylic rubbery polymer is mixed so that the amount of the rubbery polymer contained in the acrylic rubbery polymer is preferably 1 to 60 parts by weight, more preferably 1 to 30 parts by weight, even more preferably 1 to 25 parts by weight per 100 parts by weight of the thermoplastic resin composition. If the amount of the rubbery polymer is less than 1 part by weight, there is a case where the cracking resistance or vacuum moldability of the film is deteriorated or the film has poor optical isotropy due to a high photoelastic constant. On the other hand, if the amount of the rubbery polymer exceeds 60 parts by weight, the heat resistance, surface hardness, transparency, and resistance to whitening on bending of the film tend to deteriorate.

The acrylic rubbery polymer and the acrylic resin may be directly mixed when the film is manufactured, or the film may be manufactured using pellets previously formed by mixing the acrylic rubbery polymer and the acrylic resin.

The acrylic resin is not particularly limited, and may be a methacrylic resin containing methyl methacrylate as a monomer component. The methacrylic resin is preferably one containing 30 to 100 wt % of a structural unit derived from methyl methacrylate. Particularly, a heat-resistant acrylic resin is preferred. Examples of the heat-resistant acrylic resin include an acrylic resin copolymerized with an N-substituted maleimide compound as a copolymerization component, a glutaric anhydride acrylic resin, an acrylic resin having a lactone ring structure, a glutarimide acrylic resin, a hydroxyl group- and/or carboxyl group-containing acrylic resin, an aromatic vinyl-containing acrylic polymer obtained by polymerization of an aromatic vinyl monomer and another monomer copolymerizable therewith (e.g., a styrene-containing acrylic polymer obtained by polymerization of a styrene monomer and another monomer copolymerized therewith) or a hydrogenated aromatic vinyl-containing acrylic polymer obtained by partial or complete hydrogenation of aromatic rings thereof (e.g., a partially-hydrogenated styrene-containing acrylic polymer obtained by partial hydrogenation of aromatic rings of a styrene-containing acrylic polymer obtained by polymerization of a styrene monomer and another monomer copolymerizable therewith), and an acrylic polymer containing a cyclic acid anhydride repeating unit. From the viewpoint of heat resistance and optical characteristics, a glutarimide acrylic resin can be more preferably used. The glutarimide acrylic resin will be described in detail below. A specific preferred example of the glutarimide acrylic resin is one containing a unit represented by the following genera formula (1)

[Chemical Formula 1]

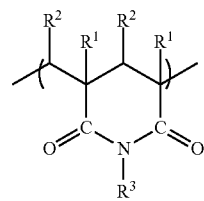

(1)

(wherein $R^1$ and $R^2$ are each independently hydrogen or an alkyl group having 1 to 8 carbon atoms and $R^3$ is an alkyl group having 1 to 18 carbon atoms, a cycloalkyl group having 3 to 12 carbon atoms, or a substituent group containing an aromatic ring having 5 to 15 carbon atoms) (hereinafter, also referred to as "glutarimide unit"), and a unit represented by the following general formula (2)

[Chemical Formula 2]

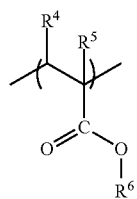

(2)

(wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or a substituent group containing an aromatic ring having 5 to 15 carbon atoms) (hereinafter, also referred to as "(meth)acrylic ester unit").

If necessary, the glutarimide acrylic resin may further contain a unit represented by the following general formula (3)

[Chemical Formula 3]

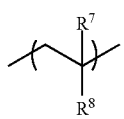

(3)

(wherein $R^7$ is hydrogen or an alkyl group having 1 to 8 carbon atoms and $R^8$ is an aryl group having 6 to 10 carbon atoms) (hereinafter, also referred to as "aromatic vinyl unit").

In the above general formula (1), $R^1$ and $R^2$ are preferably each independently hydrogen or a methyl group and $R^3$ is preferably hydrogen, a methyl group, a butyl group, or a cyclohexyl group, and $R^1$, $R^2$, and $R^3$ are more preferably a methyl group, hydrogen, and a methyl group, respectively.

The glutarimide acrylic resin may contain only one kind of glutarimide unit or two or more kinds of glutarimide units different in at least one of $R^1$, $R^2$, and $R^3$ in the above general formula (1).

The glutarimide unit can be formed by imidizing the (meth)acrylic ester unit represented by the above general formula (2).

Alternatively, the glutarimide unit may be formed by imidizing an acid anhydride such as maleic anhydride or a half ester obtained from such an acid anhydride and a linear or branched alcohol having 1 to 20 carbon atoms; or an α,β-ethylenic unsaturated carboxylic acid such as acrylic acid, methacrylic acid, maleic acid, maleic anhydride, itaconic acid, itaconic anhydride, crotonic acid, fumaric acid, or citraconic acid.

In the above general formula (2), $R^4$ and $R^5$ are preferably each independently hydrogen or a methyl group and $R^6$ is preferably hydrogen or a methyl group, and $R^4$, $R^5$, and $R^6$ are more preferably hydrogen, a methyl group, and a methyl group, respectively.

The glutarimide acrylic resin may contain only one kind of (meth)acrylic ester unit or two or more kinds of (meth) acrylic ester units different in at least one of $R^4$, $R^5$, and $R^6$ in the above general formula (2).

The glutarimide acrylic resin preferably contains styrene, α-methyl styrene, or the like, and more preferably contains styrene as the aromatic vinyl structural unit represented by the above general formula (3).

The glutarimide acrylic resin may contain only one kind of aromatic vinyl structural unit or two or more kinds of aromatic vinyl structural units different in at least one of $R^7$ and $R^8$.

The amount of the glutarimide unit represented by the general formula (1) contained in the glutarimide acrylic resin is not particularly limited, and is preferably changed depending on, for example, the structure of $R^3$.

In general, the glutarimide unit content is preferably 1 wt % or more, more preferably 1 wt % to 95 wt %, even more preferably 2 wt % to 90 wt %, particularly preferably 3 wt % to 80 wt % of the weight of the glutarimide acrylic resin. When the glutarimide unit content is within the above range, it is possible to prevent a reduction in the heat resistance and transparency of the resulting glutarimide acrylic resin or to prevent a reduction in molding processability and the mechanical strength of a film obtained by processing the resulting glutarimide acrylic resin into film. On the other hand, if the glutarimide unit content is less than the above lower limit, the resulting glutarimide acrylic resin tends to be poor in heat resistance or to have impaired transparency. If the glutarimide unit content is more than the above upper limit, heat resistance and melt viscosity become unnecessarily high, which tends to deteriorate molding processability, to significantly reduce mechanical strength during processing into film, or to impair transparency.

The amount of the aromatic vinyl unit represented by the general formula (3) contained in the glutarimide acrylic resin is not particularly limited, and may be appropriately set depending on desired physical properties. Depending on the intended use, the amount of the aromatic vinyl unit represented by the general formula (3) contained in the glutarimide acrylic resin may be 0. When the glutarimide acrylic resin contains the aromatic vinyl unit represented by the general formula (3), the aromatic vinyl unit content is preferably 10 wt % or more, more preferably 10 wt % to 40 w %, even more preferably 15 wt % to 30 wt %, particularly preferably 15 wt % to 25 wt % with respect to the total amount of the repeat units of the glutarimide acrylic resin. When the aromatic vinyl unit content is within the above range, it is possible to prevent the resulting glutarimide acrylic resin from having poor heat resistance or to prevent a reduction in mechanical strength during processing into film. On the other hand, if the aromatic vinyl content exceeds the above upper limit, the resulting glutarimide acrylic resin tends to have poor heat resistance.

If necessary, the glutarimide acrylic resin may further be copolymerized with another unit other than the glutarimide unit, the (meth)acrylic ester unit, and the aromatic vinyl unit.

The another unit may be, for example, a structural unit obtained by copolymerization of a nitrile-based monomer such as acrylonitrile or methacrylonitrile or a maleimide-based monomer such as maleimide, N-methyl maleimide, N-phenyl maleimide, or N-cyclohexyl maleimide.

Such another unit may be directly copolymerized or graft-copolymerized with the glutarimide acrylic resin.

The weight-average molecular weight of the glutarimide acrylic resin is not particularly limited, but is preferably $1\times10^4$ to $5\times10^5$. When the weight-average molecular weight is within the above range, it is possible to prevent a reduction in molding processability or to prevent poor mechanical strength during processing into film. On the other hand, if the weight-average molecular weight is less than the above lower limit, a film obtained by processing the glutarimide acrylic resin into film tends to be poor in mechanical strength. If the weight-average molecular weight exceeds the above upper limit, molding processability is reduced due to high viscosity during melt extrusion, which tends to reduce the productivity of a molded article.

The glass transition temperature of the glutarimide acrylic resin is not particularly limited, but is preferably 110° C. or higher, more preferably 120° C. or higher. When the glass transition temperature is within the above range, it is possible to extend the range of application of the resulting thermoplastic resin composition.

A method for manufacturing the glutarimide acrylic resin is not particularly limited, and may be, for example, the method described in JP 2008-273140 A.

The thermoplastic resin composition used in one or more embodiments of the present invention may contain an agent for improving thermal stability or light stability such as an antioxidant, a UV absorber, or a UV stabilizer. These agents may be used singly or in combination of two or more of them.

An optical film according to one or more embodiments of the present invention is made of a rubber-containing thermoplastic resin composition, and the number of recess defects having a major axis length of 20 µm or more present in the surface of the optical film per A4 size (210 mm×297 mm) is 20 or less. The optical film according to one or more embodiments of the present invention is stably manufactured by the above-described manufacturing method according to one or more embodiments of the present invention. In general, recess defects formed in the surface of a film by insertion molding may have a major axis length of several micrometers to several hundred micrometers, but particularly, recess defects having a major axis length of 20 µm or more cause a problem when the film is used in a liquid crystal display. If recess defects having a major axis length of 20 µm or more are present in the surface of a film, light is refracted at the surface of the film, which may cause the contrast of transmitted light. In order to appropriately use a film in a liquid crystal display, the number of recess defects having a major axis length of 20 µm or more present in the surface of the film per A4 size is preferably 20 or less, more preferably 10 or less, most preferably 0.

The orientation birefringence of the optical film according to one or more embodiments of the present invention is preferably $-1.7\times10^{-4}$ to $1.7\times10^{-4}$, more preferably $-1.6\times10^{-4}$ to $1.6\times10^{-4}$, even more preferably $-1.5\times10^{-4}$ to $1.5\times10^{-4}$, even more preferably $-1.0\times10^{-4}$ to $1.0\times10^{-4}$, particularly preferably $-0.5\times10^{-4}$ to $0.5\times10^{-4}$, most preferably $-0.2\times10^{-4}$ to $0.2\times10^{-4}$.

The photoelastic constant of the optical film according to one or more embodiments of the present invention is preferably $-10\times10^{-12}$ to $4\times10^{-12}$ Pa$^{-1}$. Particularly, when the photoelastic constant is as small as $-4\times10^{-12}$ Pa to $4\times10^{-12}$ Pa$^{-1}$, it is possible to prevent birefringence caused by external stress. More specifically, in this case, the photoelastic constant is preferably $-4\times10^{-12}$ to $4\times10^{-12}$ Pa$^{-1}$, more preferably $-1.5\times10^{-12}$ Pa$^{-1}$ to $1.5\times10^{-12}$ Pa$^{-1}$, even more preferably $-1.0\times10^{-12}$ Pa$^{-1}$ to $1.0\times10^{-12}$ Pa$^{-1}$, even more preferably $-0.5\times10^{-12}$ Pa$^{-1}$ to $0.5\times10^{-12}$ Pa$^{-1}$, most preferably $-0.3\times10^{-12}$ Pa$^{-1}$ to $0.3\times10^{-12}$ Pa$^{-1}$. This significantly reduces the birefringence of the optical film, and therefore a reduction in the brightness of backlight can be prevented. Therefore, the optical film according to one or more embodiments of the present invention can be particularly appropriately used for liquid crystal displays.

Further, when the optical film according to one or more embodiments of the present invention having a photoelastic constant of $-10\times10^{-12}$ to $-4\times10^{-12}$ Pa is bonded to a member having a positive photoelastic constant in a liquid crystal display, birefringences caused by the application of external stress cancel each other so that a reduction in the brightness of backlight can be prevented.

The thickness of the optical film according to one or more embodiments of the present invention is preferably 30 µm or more but less than 80 µm, more preferably 30 µm or more but less than 70 µm, even more preferably 30 µm or more but 60 µm or less. When the thickness is as small as less than 80 µm, a reduction in the brightness of backlight can be prevented and a reduction in the thickness of a liquid crystal display can be achieved. Therefore, the optical film according to one or more embodiments of the present invention can be particularly appropriately used for liquid crystal displays. However, if the thickness is less than 30 µm, the entire surface of the optical film cannot be evenly smoothened by insertion molding, and therefore there is a fear that part of the surface of the film is not smooth.

The optical film manufactured by one or more embodiments of the present invention can be used as a member for use in a display device such as a liquid crystal display or an organic EL display, for example, a polarizer protective film, a phase difference film, a brightness enhancement film, a liquid crystal substrate, a light diffusion film, or a prism sheet. Among them, the optical film is suitable for use as a polarizer protective film or a phase difference film.

EXAMPLES

Hereinbelow, one or more embodiments of the present invention will be described in more detail based on examples, but the present invention is not limited to these examples. It is to be noted that various physical properties were measured in the following examples and comparative examples according to the following methods.

(Glass Transition Temperature)

The glass transition temperature of a sample was determined using a differential scanning calorimeter (DSC) SSC-5200 manufactured by Seiko Instruments Inc. in the following manner. The sample was preliminarily treated by once increasing the temperature of the sample to 200° C. at a rate of 25° C./min, holding the sample at 200° C. for 10 minutes, and decreasing the temperature of the sample to 50° C. at a rate of 25° C./min. Then, the DSC curve of the sample was measured while the temperature of the sample was increased to 200° C. at a temperature rise rate of 10° C./min. The integral of the thus obtained DSC curve (DDSC) was determined, and the glass transition temperature of the sample was determined from the maximum point of DDSC.

(Evaluation of Recesses)

An obtained film was cut to A4 size (210 mm×297 mm) and visually checked to mark defects. Then, the defects were observed with a digital microscope VHX1000 manufactured by KEYENCE CORPORATION at 100-fold magnification to extract recess defects that were present in the surface of the film, contained no foreign matter therein, and had a major axis length of 20 µm or more. It is to be noted that periodical recesses caused by roller transfer were excluded.

(Melt Viscosity)

The melt viscosity of pellets was measured using a capillary rheometer at a resin temperature at the outlet of an extruder in each of the examples and comparative examples and a shear velocity of 122 sec$^{-1}$.

(Orientation Birefringence)

A test piece of 40 mm×40 mm was cut out from the film, and then its in-plane phase difference was measured using an automatic birefringence meter (KOBRA-WR) at a wavelength of 590 nm and an incident angle of 0°. Then, the in-plane phase difference was divided by the thickness of the test piece to calculate orientation birefringence.

(Photoelastic Constant)

A strip-shaped test specimen was cut out from the film to be 90 mm in the film width direction and 15 mm in the film flow direction. Then, the birefringence of the film was measured using an automatic birefringence meter (KOBRA-WR) manufactured by Oji Scientific Instruments Co., Ltd at a wavelength of 590 nm and an incident angle of 0° in a state where one of the long sides of the film was fixed, and a load ranging from 0 kgf to 4 kgf was applied in increments of 0.5 kgf to the other long side. From the thus obtained result, the amount of birefringence change under unit stress was calculated.

Manufacturing Example 1

Manufacturing of Glutarimide Acrylic Resin (A1)

A glutarimide acrylic resin (A1) was manufactured using polymethyl methacrylate as a raw material resin and monomethylamine as an imidization agent.

In this production, a tandem-type reactive extruder was used in which two extrusion reactors were arranged in series.

The tandem-type reactive extruder had a first extruder and a second extruder, and both the extruders were intermeshing co-rotating twin screw extruders having a diameter of 75 mm and an L/D (ratio of length L to diameter D of extruder) of 74. The raw material resin was supplied to the raw material supply port of the first extruder using a loss-in-weight feeder (manufactured by Kubota Corporation).

The pressure in each of the vents of the first extruder and the second extruder was reduced to −0.095 MPa. Further, the first extruder and the second extruder were connected through a pipe having a diameter of 38 mm and a length of 2 m, and a constant flow pressure valve was used as a system for controlling the pressure in a part connecting the resin discharge port of the first extruder and the raw material supply port of the second extruder.

A resin (strand) discharged from the second extruder was cooled on a cooling conveyer and then cut into pellets by a pelletizer. In order to adjust the pressure in the part connecting the resin discharge port of the first extruder and the raw material supply port of the second extruder or to detect uneven extrusion, resin pressure meters were provided at the discharge port of the first extruder, the center of the part connecting the first extruder and the second extruder, and the discharge port of the second extruder.

In the first extruder, a polymethyl methacrylate resin (Mw: 105000) was used as a raw material resin and monomethylamine was used as an imidization agent to manufacture an imide resin intermediate 1. At this time, the temperature of maximum temperature portion of the extruder was 280° C., the screw rotation speed of the extruder was 55 rpm, the amount of the raw material resin supplied was 150 kg/h, and the amount of monomethylamine added was 2.0 parts per 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to manufacture an imide resin intermediate 2. At this time, the temperature of each barrel of the extruder was 260° C., the screw rotation speed of the extruder was 55 rpm, the amount of dimethyl carbonate added was 3.2 parts per 100 parts of the raw material resin. Further, the esterification agent was removed through a vent. Then, the thus obtained glutarimide acrylic resin (A1) was extruded through a strand die, cooled in a water bath, and pelletized by a pelletizer.

The glutarimide acrylic resin (A1) was an acrylic resin obtained by copolymerization of a glutarimide unit and a (meth)acrylic ester unit.

Manufacturing Example 2

Manufacturing of Graft Copolymer (B2)

The following materials were charged into an 8-liter polymerization apparatus equipped with a stirrer.

| | |
|---|---|
| Deionized water | 200 parts |
| Sodium polyoxyethylene lauryl ether phosphate | 0.05 parts |
| Sodium formaldehyde sulfoxylate | 0.11 parts |
| Disodium ethylenediaminetetraacetate | 0.004 parts |
| Ferrous sulfate | 0.001 parts |

Air inside the polymerization apparatus was sufficiently purged with nitrogen gas so that there was substantially no oxygen in the polymerization apparatus. Then, the temperature inside the polymerization apparatus was adjusted to 40° C., and 45.491 parts of a raw material mixture of acrylic rubber particles (B-1) (45 parts of a monofunctional monomer mixture comprising 90% of butyl acrylate and 10% of methyl methacrylate, 0.45 parts of allyl methacrylate, and 0.041 parts of cumene hydroperoxide) was continuously added over 225 minutes. After 20 minutes, 40 minutes, and 60 minutes from the start of addition of (B-1), 0.2 parts of sodium polyoxyethylene lauryl ether phosphate (sodium salt of polyoxyethylene lauryl ether phosphate manufactured by Toho Chemical Industry Co., Ltd. under the trade name of Phosphanol RD-510Y) was each time added to the polymerization apparatus. After the completion of the addition, polymerization was further continued for 0.5 hours to obtain acrylic rubber particles (polymer (B-1)). The rate of polymerization conversion was 98.6%.

Then, the temperature in the polymerization apparatus was adjusted to 60° C., and 0.2 parts of sodium formaldehyde sulfoxylate was charged into the polymerization apparatus. Then, 55.554 parts of a raw material mixture of a hard polymer layer (B-2) (55 parts of a monofunctional monomer mixture comprising 57.8% of methyl methacrylate, 4% of butyl acrylate, and 38.2% of benzyl methacrylate, 0.3 parts of t-dodecyl mercaptan, and 0.254 parts of cumene hydroperoxide) was continuously added over 210 minutes, and polymerization was further continued for 1 hour to obtain a graft copolymer latex. The rate of polymerization conversion was 100.0%. The thus obtained latex was subjected to salting-out and coagulation with magnesium sulfate, washing with water, and drying to obtain a white powdery graft copolymer (B2).

The rubber particles (polymer (B-1)) of the graft copolymer (B2) had an average particle size of 121 nm. The graft rate of the graft copolymer (B2) was 56%.

Manufacturing Example 3

Manufacturing of Resin Pellets

A single screw extruder using a full flight screw having a diameter of 40 mm was used. The temperature of temperature control zone of the extruder was set to 255° C., and the screw rotation speed of the extruder was set to 52 rpm, and a mixture of 53 parts by weight of the glutarimide acrylic resin (A1) and 47 parts by weight of the white powdery graft copolymer (B2) was supplied at a rate of 10 kg/hr. The resin discharged as a strand from a die provided at the outlet of the extruder was cooled in a water tank and pelletized by a pelletizer. The melt viscosity of the pellets was measured in the above-described manner.

Example 1

The pellets (glass transition temperature Tg: 120° C.) obtained in Manufacturing Example 3 were used as a rubber-containing thermoplastic resin composition. The pellets were dried in a drier at 80° C. for 4 hours and then supplied to a φ90 mm single screw extruder. Screen meshes #40, #100, #400, #400, #100, and #40 were provided at the outlet of the extruder in layers in this order from the extruder side. The pellets were melted by heating so that the resin temperature at the outlet of the extruder was 250° C., and the resulting molten resin was extruded through a gear pump into a T-die. At this time, the resin temperature at the outlet of the T-die just after discharge was 250° C., and the melt viscosity of the pellets at this temperature and 122 sec$^{-1}$ was 1050 Pa·sec. The angle which the T-die formed with a cast roller was set to 5 degrees, and the discharged molten film was inserted between the cast roller adjusted to 100° C. and a touch roller (FLEX ROLL as an elastic roller) adjusted to 60° C. so as to be cooled and solidified by pressing the touch roller under conditions previously set so that an insertion pressure was 5 kgf/cm at a line velocity of 17 m/min, and the solidified film was taken up by a take-up roller to obtain a 60 μm-thick original film wound around a core. It is to be noted that the value of η×V/P at this time was 3570. The original film was slit along its both ends to have a width of 1450 mm.

The number of recess defects of the obtained rubber particle-containing acrylic resin film per A4 size was 0. Further, the film had a photoelastic constant of 0.35×10$^{-12}$ Pa$^{-1}$ and an orientation birefringence of −0.13×10$^{-14}$, and did not show birefringence.

Example 2

A rubber particle-containing acrylic resin film was obtained in the same manner as in Example 1 except that the resin temperature at the outlet of the T-die was changed to 235° C. (melt viscosity at 122 sec$^{-1}$ was 1500 Pa·sec) and the line velocity was changed to 15 m/min. It is to be noted that the value of η×V/P at this time was 4500.

The number of recess defects of the obtained rubber particle-containing acrylic resin film per A4 size was 10.

Example 3

A rubber particle-containing acrylic resin film was obtained in the same manner as in Example 1 except that line velocity was changed to 20 m/min and the angle which the T-die formed with the cast roller was changed to 2 degrees. It is to be noted that the value of η×V/P at this time was 4200.

The number of recess defects of the obtained rubber particle-containing acrylic resin film per A4 size was 20.

Example 4

A rubber particle-containing acrylic resin film was obtained in the same manner as in Example 2 except that the insertion pressure was changed to 10 kgf/cm. It is to be noted that the value of η×V/P at this time was 2250.

The number of recess defects of the obtained rubber particle-containing acrylic resin film per A4 size was 0.

Example 5

A rubber particle-containing acrylic resin film was obtained in the same manner as in Example 1 except that the angle which the T-die formed with the cast roller was changed to 0 degrees. It is to be noted that the value of η×V/P at this time was 3570.

The number of recess defects of the obtained rubber particle-containing acrylic resin film per A4 size was 5.

Example 6

The pellets (glass transition temperature Tg: 120° C.) obtained in Manufacturing Example 3 were used as a rubber-containing thermoplastic resin composition. The pellets were dried in a drier at 80° C. for 4 hours and then supplied to a φ90 mm single screw extruder. Screen meshes #40, #100, #400, #400, #100, and #40 were provided at the outlet of the extruder in layers in this order from the extruder side. The pellets were melted by heating so that the resin temperature at the outlet of the extruder was 250° C., and the resulting molten resin was extruded through a gear pump into a T-die. At this time, the resin temperature at the outlet of the T-die just after discharge was 250° C., and the melt viscosity of the pellets at this temperature and 122 sec$^{-1}$ was 1050 Pa·sec. The angle which the T-die formed with a cast roller was set to 0 degrees, and the discharged molten film was inserted between the cast roller adjusted to 100° C. and a touch roller (FLEX ROLL as an elastic roller) adjusted to 60° C. so as to be cooled and solidified by pressing the touch roller under conditions previously set so that an insertion pressure was 5 kgf/cm at a line velocity of 15 m/min, and the solidified film was taken up by a take-up roller to obtain a 40 μm-thick original film wound around a core. It is to be noted that the value of η×V/P at this time was 3150. The original film was slit along its both ends to have a width of 1450 mm.

The number of recess defects of the obtained rubber particle-containing acrylic resin film per A4 size was 0.

Comparative Example 1

A rubber particle-containing acrylic resin film was obtained in the same manner as in Example 2 except that the line velocity was changed to 20 m/min and the amount of the molten film discharged by extrusion was changed so that the thickness of the film was 60 μm at a line velocity of 20/min. It is to be noted that the value of η×V/P at this time was 6000.

The number of recess defects of the obtained rubber particle-containing acrylic resin film per A4 size was 500.

Comparative Example 2

A rubber particle-containing acrylic resin film was obtained in the same manner as in Example 1 except that the line velocity was changed to 25 m/min and the amount of the molten film discharged by extrusion was changed so that the thickness of the film was 60 μm at a line velocity of 25 m/min. It is to be noted that the value of η×V/P at this time was 5250.

The number of recess defects of the obtained rubber particle-containing acrylic resin film per A4 size was 100.

Comparative Example 3

A rubber particle-containing acrylic resin film was obtained in the same manner as in Example 2 except that the insertion pressure was changed to 2.0 kgf/cm, the line velocity was changed to 17 m/min, and the amount of the molten film discharged by extrusion was changed so that the thickness of the film was 60 μm at a line velocity of 17 m/min. It is to be noted that the value of η×V/P at this time was 12750.

The number of recess defects of the obtained rubber particle-containing acrylic resin film per A4 size was 900.

Comparative Example 4

A rubber particle-containing acrylic resin film was obtained in the same manner as in Example 1 except that the resin temperature at the outlet of the T-die was changed to 220° C. (melt viscosity at 122 sec$^{-1}$ was 2100 Pa·sec) and the line velocity was changed to 10 m/min. It is to be noted that the value of η×V/P at this time was 4200.

The number of recess defects of the obtained rubber particle-containing acrylic resin film per A4 size was 2000.

Comparative Example 5

A rubber particle-containing acrylic resin film was obtained in the same manner as in Example 1 except that the temperature of the touch roller was changed to 40° C. It is to be noted that the value of η×V/P at this time was 3750.

The number of recess defects of the obtained rubber particle-containing acrylic resin film per A4 size was 500.

Comparative Example 6

A rubber particle-containing acrylic resin film was obtained in the same manner as in Example 6 except that the line velocity was changed to 25 m/min and the amount of the molten film discharged by extrusion was changed so that the thickness of the film was 40 μm at a line velocity of 25 m/min. It is to be noted that the value of η×V/P at this time was 5250.

The number of recess defects of the obtained rubber particle-containing acrylic resin film per A4 size was 2000.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

TABLE 1

|  | Example 1 | Example 2 | Example 3 | Example 4 | Example 5 | Example 6 |
|---|---|---|---|---|---|---|
| Film thickness | 60 | 60 | 60 | 60 | 60 | 40 |
| Tg | 120 | 120 | 120 | 120 | 120 | 120 |
| Resin temperature at discharge | 250 | 235 | 250 | 235 | 250 | 250 |
| Melt viscosity η [PaS] | 1050 | 1500 | 1050 | 1500 | 1050 | 1050 |
| Elastic roller temperature | 60 | 60 | 60 | 60 | 60 | 60 |
| Line velocity [m/min] | 17 | 15 | 20 | 15 | 17 | 15 |
| Insertion pressure [kgf/cm] | 5 | 5 | 5 | 10 | 5 | 5 |
| η × V/P | 3570.0 | 4500.0 | 4200.0 | 2250.0 | 3570.0 | 3150.0 |
| Angle | 5.0 | 5.0 | 2.0 | 5.0 | 0.0 | 0.0 |
| Number of recesses per A4 size | 0 | 10 | 20 | 0 | 5 | 5 |

|  | Comparative Example 1 | Comparative Example 2 | Comparative Example 3 | Comparative Example 4 | Comparative Example 5 | Comparative Example 6 |
|---|---|---|---|---|---|---|
| Film thickness | 60 | 60 | 60 | 60 | 60 | 40 |
| Tg | 120 | 120 | 120 | 120 | 120 | 120 |
| Resin temperature at discharge | 235 | 250 | 235 | 220 | 250 | 250 |
| Melt viscosity η [PaS] | 1500 | 1050 | 1500 | 2100 | 1050 | 1050 |
| Elastic roller temperature | 60 | 60 | 60 | 60 | 40 | 60 |
| Line velocity [m/min] | 20 | 25 | 17 | 10 | 17 | 25 |
| Insertion pressure [kgf/cm] | 5 | 5 | 2 | 5 | 5 | 5 |
| η × V/P | 6000.0 | 5250.0 | 12750.0 | 4200.0 | 3570.0 | 5250.0 |
| Angle | 5.0 | 5.0 | 5.0 | 5.0 | 5.0 | 0.0 |
| Number of recesses per A4 size | 500 | 100 | 900 | 2000 | 500 | 2000 |

REFERENCE SIGNS LIST 10 extruder
11 die
12 die outlet
13 sheet-shaped thermoplastic resin composition
14 elastic roller
15 cast roller
21 direction of discharge from die outlet
22 direction of flow of sheet-shaped thermoplastic resin composition
23 angle which 21 forms with 22

The invention claimed is:

1. A method for manufacturing an optical film, the method comprising:
molding a sheet-shaped rubber-containing thermoplastic resin composition discharged in a molten state from a die outlet of an extruder by inserting the composition between a pair of smoothing rollers comprising an elastic roller and a cast roller, wherein
a melt viscosity η of the rubber-containing thermoplastic resin composition as measured at a temperature of the rubber-containing thermoplastic resin composition during the discharge from a die and a shear velocity of 122 sec$^{-1}$ is 600 Pa·sec or more but 2000 Pa·sec or less;
a surface temperature of the elastic roller is Tg−70° C. or higher but Tg−20° C. or lower, wherein Tg represents a glass transition temperature (° C.) of the rubber-containing thermoplastic resin composition; and η×V/P is 5000 or less, wherein V represents a line velocity (m/min) and P represents a pressure applied by the elastic roller (kgf/cm).

2. The method for manufacturing an optical film according to claim 1, wherein a direction of flow of the sheet-shaped rubber-containing thermoplastic resin composition is inclined toward a side of the cast roller with respect to a direction of discharge from the die outlet so that an angle which the direction of flow of the sheet-shaped rubber-containing thermoplastic resin composition forms with the direction of discharge from the die outlet is in a range of 0.1 degrees or more but 20 degrees or less.

3. The method for manufacturing an optical film according to claim 1, wherein the optical film has a thickness of 30 μm or more but less than 80 μm.

4. The method for manufacturing an optical film according to claim 1, wherein the melt viscosity of the rubber-containing thermoplastic resin composition as measured at 250° C. and a shear velocity of 122 sec$^{-1}$ is 700 Pa·sec or more but 1250 Pa·sec or less.

5. The method for manufacturing an optical film according to claim 1, wherein the rubber-containing thermoplastic resin composition contains an acrylic resin and acrylic rubber particles.

6. The method for manufacturing an optical film according to claim 1, wherein the rubber-containing thermoplastic resin composition contains at least one selected from the group consisting of an acrylic resin copolymerized with an N-substituted maleimide compound as a copolymerization component, a glutaric anhydride acrylic resin, an acrylic resin having a lactone ring structure, a glutarimide acrylic resin, a hydroxyl group- and/or carboxyl group-containing acrylic resin, an aromatic vinyl-containing acrylic polymer obtained by polymerization of an aromatic vinyl monomer and another monomer copolymerizable therewith or a hydrogenated aromatic vinyl-containing acrylic polymer obtained by partial or complete hydrogenation of aromatic rings thereof, and an acrylic polymer containing a cyclic acid anhydride repeating unit.

* * * * *